US006261024B1

(12) United States Patent
Färber

(10) Patent No.: US 6,261,024 B1
(45) Date of Patent: Jul. 17, 2001

(54) ROCKER DEVICE FOR AN OPENABLE MOTOR VEHICLE ROOF AND PROCESS FOR MOUNTING ONE SUCH DEVICE

(75) Inventor: Manfred Färber, Wielenbach (DE)

(73) Assignee: Webasto Karosseriesysteme GmbH, Stockdorf (DE)

(*) Notice: Subject to any disclaimer, the term of this patent is extended or adjusted under 35 U.S.C. 154(b) by 0 days.

(21) Appl. No.: 09/133,329

(22) Filed: Aug. 13, 1998

(30) Foreign Application Priority Data

Aug. 14, 1997 (DE) .............................................. 197 35 182

(51) Int. Cl.⁷ ...................................................... F16C 11/00
(52) U.S. Cl. .............................. 403/145; 403/146; 16/324
(58) Field of Search ..................................... 403/145, 146, 403/119, 254, 229; 16/324

(56) References Cited

U.S. PATENT DOCUMENTS

| | | | |
|---|---|---|---|
| 2,923,359 | * | 2/1960 | Duffield et al. ....................... 403/146 |
| 3,861,635 | * | 1/1975 | Juris ................................... 403/145 X |
| 4,102,439 | * | 7/1978 | Calderazzo . |
| 4,138,838 | * | 2/1979 | Long ................................. 403/146 X |
| 4,192,622 | * | 3/1980 | Stecklein ............................... 403/146 |
| 4,447,170 | * | 5/1984 | Holmes ............................ 403/146 X |
| 4,589,497 | * | 5/1986 | Kovar ................................... 172/707 |
| 4,709,445 | * | 12/1987 | Waldo et al. ..................... 403/146 X |
| 4,932,807 | * | 6/1990 | Rhodes ............................. 403/146 X |
| 5,022,778 | * | 6/1991 | Lu ..................................... 403/146 X |
| 5,219,240 | * | 6/1993 | Kitamura .......................... 403/146 X |
| 5,224,739 | * | 7/1993 | Sauter ................................. 403/229 |
| 5,467,504 | * | 11/1995 | Yang .................................. 403/146 X |
| 5,555,954 | * | 9/1996 | Swiderski ............................. 182/152 |
| 5,566,048 | * | 10/1996 | Esterberg et al. ............... 403/146 X |
| 5,603,581 | * | 2/1997 | Fujita et al. ...................... 403/254 X |
| 5,820,279 | * | 10/1998 | Lodwig et al. . |
| 5,897,160 | * | 4/1999 | Reihl et al. ..................... 296/220.01 |
| 5,911,536 | * | 6/1999 | Roth ................................. 403/145 X |

* cited by examiner

Primary Examiner—Lynne H. Browne
Assistant Examiner—John R. C. Hingham
(74) Attorney, Agent, or Firm—Nixon Peabody LLP; David S. Safran

(57) ABSTRACT

A rocker device for an openable motor vehicle roof, with support element (14), rocker element (12) and spring (30) has the rocker element (12) connected to pivot relative to the support element (14) via an axle (10). The spring (30) is located between the rocker element and support element such that it applies a pre-stressing force to the rocker element (12) with respect to the direction of pivoting motion. Furthermore, the spring is a helical spring arranged and formed such that it provides pre-stressing force between the rocker element and support element in an axial direction. The axle is stationary with respect to one element and is guided in the other element through a corresponding axial opening (16). A process for mounting of this device provides for attaching of the helical spring to the free end of the axle such that an inner end of the spring fits into a mounting groove (26) in the axle (10), pushing of the spring (30) axially along the groove (26) until the inner end of the spring fits into a receiving opening (28), and then moving the outer end (34) of the helical spring against the circumferential spring force beyond and onto a projection (34) on the support (14) so that the outer end of the fits around the projection.

11 Claims, 1 Drawing Sheet

ROCKER DEVICE FOR AN OPENABLE MOTOR VEHICLE ROOF AND PROCESS FOR MOUNTING ONE SUCH DEVICE

BACKGROUND OF THE INVENTION

1. Field of Invention

The invention relates to a rocker device for an openable motor vehicle roof, with a support element, a rocker element and a spring, the rocker element being connected to pivot about an axis, with the support element and the spring being located between the rocker element and support element such that it applies a pre-stressing force to the rocker element with respect to the direction of the pivoting motion. The invention is also directed to a process for mounting such a device.

2. Description of Related Art

A device of the type to which the present invention is directed is known from German Patent DE 196 08 916 C1 which corresponds to U.S. patent application Ser. No. 08/812,663, filed May 7, 1997. This known rocker device forms one part of the attachment elements which can be pivoted outward for a louvered roof. On an adjustment element of the attachment element which forms the support element of the rocker device, the adjustment elements are guided in the lengthwise direction of the roof, the rocker element, made as a lock rocker, is attached to the adjustment element to pivot by means of an axle made as a pivot bearing. The pivot bearing consists of a riveted eye. A spring made as a helical spring is attached to the pivot bearing in order to apply a pivot prestress to the lock rocker with respect to the adjustment element. When the louver system is opened/closed, the attachment elements are automatically coupled, depending on their swivel position, with their adjacent attachment element via swivel motion of the corresponding lock rocker or decoupled therefrom.

It is a disadvantage, here, that it is relatively complex to axially secure the rocker element by means of a riveted eye, and the riveted eye makes dismounting difficult, and furthermore, allows axial play between the rocker element and the support element.

SUMMARY OF THE INVENTION

The primary object of this invention is to prevent the above indicated disadvantages of the prior art device in as simple and economical manner as possible.

This object is achieved by providing a rocker device of the initially mentioned type with a spring arranged and formed such that it provides for a pre-stressing force in an axial direction between the rocker element and the support element, and that furthermore, providing an axis for the rocker that is stationary with respect to one element and is guided in the other element through a corresponding axial opening.

This approach according to the invention is advantageous in that the rocker device can be built very easily with a minimum number of parts and can be easily and quickly mounted. Additionally, simple dismounting is possible, and the spring allows axial tolerance compensation. Furthermore, there is zero axial backlash, which ensures the absence of rattling in operation.

In one advantageous embodiment of the invention, it is provided that the spring is made as a helical spring which is arranged concentrically to the axis, the one spring end being stationary with respect to the axis and the other spring end being stationary with respect to the other element. This represents one especially simple embodiment.

In another preferred embodiment the spring is located on the free end of the axle and runs around the axle, the inner spring end being inserted into a receiving opening in the axle and the outer spring end being made as a leg which is bent outwardly in a U-shape relative to the spring plane and which surrounds a projection on the corresponding element.

Furthermore, it is preferably provided that the axle is provided on its free end with a mounting groove which is formed axially in the peripheral surface and which is beveled relative to the free end of the axle towards the axle center, on its other end the receiving opening is made as a radially running cylindrical opening, and that the inner end of the spring end is made essentially as a straight piece which runs radially in the spring plane.

This arrangement allows especially simple mounting by the axle being inserted through the opening, the spring being attached to the free end of the axle such that the inner end of the spring fits into the mounting groove, the spring is pushed in the axial direction onto the axle until the inner spring end fits into the receiving opening, and finally the outer end of the spring is moved against the tangential spring force above the projection so that the leg fits around the projection.

In addition, preferably the axle is made integral with the rocker element. This represents an especially simple structure.

These and further objects, features and advantages of the present invention will become apparent from the following description when taken in connection with the accompanying drawings which, for purposes of illustration only, show a single embodiment in accordance with the present invention.

DETAILED DESCRIPTION OF THE INVENTION

Figure 1:
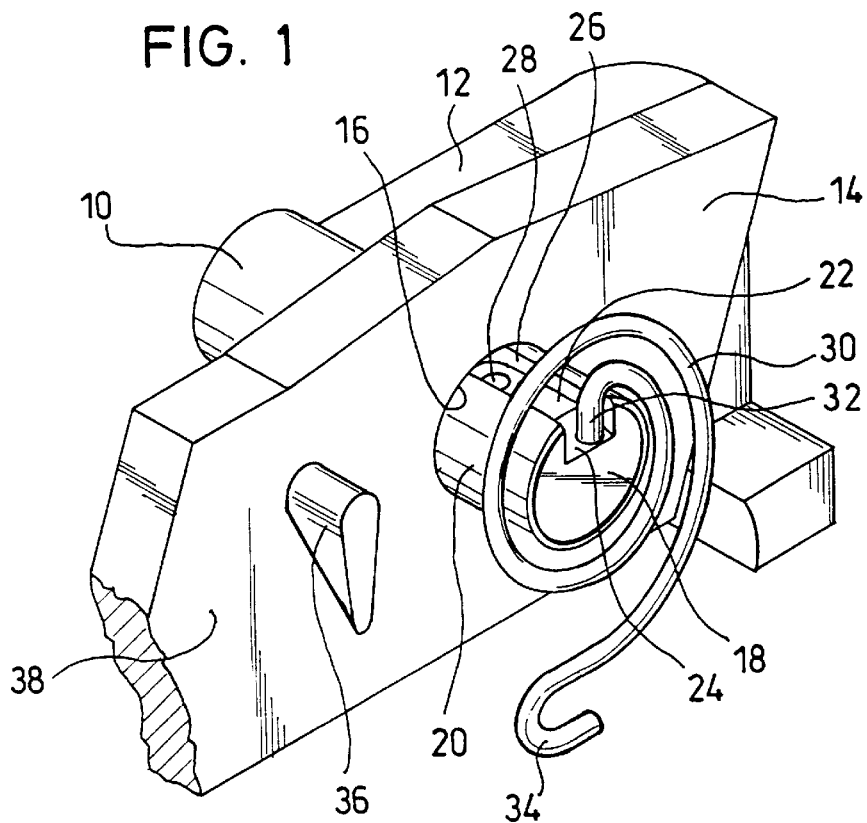
FIG. 1 is a perspective view of a rocker device at the start of the mounting process.
Figure 2:
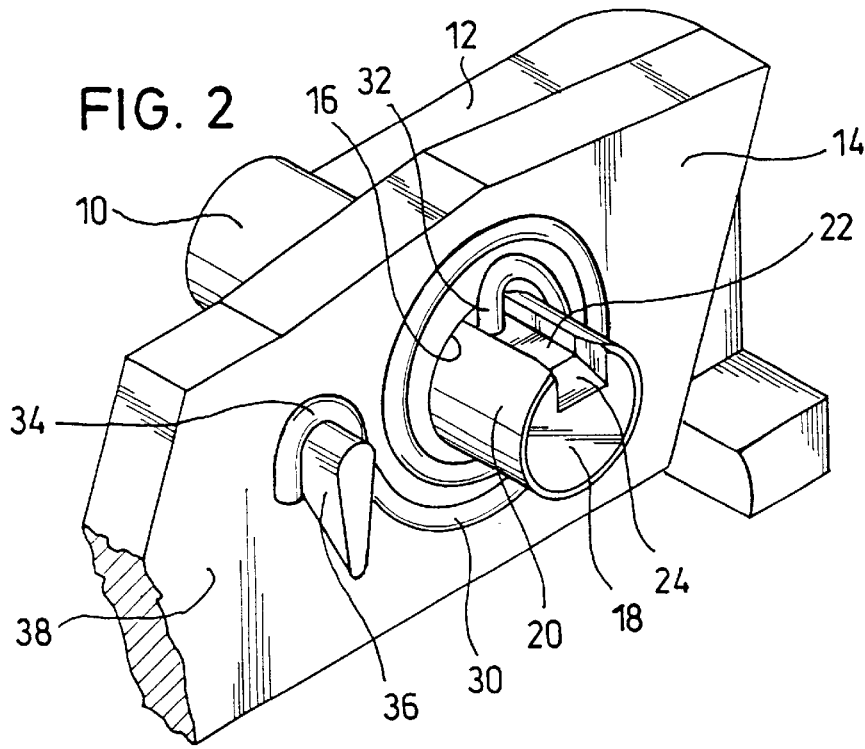
FIG. 2 is a view similar to that of FIG. 1, but after completion of the mounting process.

As shown in FIG. 1, at the start of mounting of a rocker device according to the invention, an axle 10, which is joined integrally with rocker element 12, for example, a lock rocker for the attachment element of a louvered roof as is described in the above mentioned German Patent DE 196 08 916 C1, is pushed through an axial opening 16 formed in a support element 14. The support element 14, in this case, forms an adjustment element as is described in German Patent DE 196 08 916 C1. Support element 14 and rocker element 12 are shown only schematically in FIGS. 1 and 2.

Axle 10 is provided on its free end 18 with a mounting groove 22 which is formed axially in its peripheral surface 20. Groove 22 is beveled relative to the free end 18 of axle 10, radially inwardly towards the axle centerline, i.e. is provided with obliquely running surface 24. By the other end 26 of mounting groove 22, a receiving opening 28 is provided in the form of a radially directed cylindrical opening.

A helical spring 30 has an inner end 32 which is made essentially as a straight piece which runs radially in the spring plane, and is attached to free end 18 of axle 10 such that inner end 32 of spring 30 fits into mounting groove 22, and thus, adjoins oblique surface 24. Spring 30 is then pushed in the axial direction along axle 10 until inner spring end 32 fits into receiving opening 28. The length of inner spring end 32 is selected such that the spring tension presses inner spring end 32 into receiving opening 28 and holds it therein. Spring 30 now sits on axle 10 or runs around it.

The outer spring end is made as a leg 34 which is bent outwardly into a U-shape in the spring plane and which, first of all, is roughly opposite inner spring end 32. In the following, leg 34 is turned clockwise against the circumferential prestress of spring 30 until it passes and then is engages on the projection 36 formed on support element 14. In this position, the leg 34 is held by circumferential spring force, see FIG. 2.

Receiving opening 28 with inner spring end 32 is arranged such that, in the absence of external forces by the axial spring force, it has a certain distance from the edge of axle opening 16 or side surface 38 of support element 14. In this way, spring 30 applies an axial prestress to rocker element 12 with respect to support element 14 so that, on the one hand, production tolerances are balanced, and on the other hand, axial play between rocker element 12 and support element 14 is prevented; in operation, such play can lead to undesirable rattling noise. Because inner spring end 32 fits into receiving opening 28 in axle 10, the axle 10 is prevented from sliding out of axle opening 16 against the axial prestress of spring 30. Furthermore, spring 30 provides for the pivot prestress for rocker element 12 (or the lock rocker) that is necessary for it function with respect to support element 14.

Since irreversible deformations or material connections do not occur during mounting, the rocker device can also be easily dismounted again.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Rocker device for an openable motor vehicle roof, comprising a support element, a rocker element, an axle and a spring, the rocker element being connected to pivot via the axle with respect to the support element, and the spring acting between the rocker element and support element in a manner applying a pre-stressing force to the rocker element with respect to a direction of pivot motion; wherein the spring is arranged and formed in a manner for also applying a pre-stressing force between the rocker element and the support element in a lengthwise direction of said axle; and wherein the axle is stationary with respect to one of the rocker element and the support element, is guided through a corresponding axial opening in the other of the rocker element and the support element; and is axially positioned solely by said spring.

2. Rocker device as claimed in claim 1, wherein the spring is a helical spring which runs concentrically in a radial plane relative to the axle, one end of the spring being stationary with respect to the axle and the other end of the spring being stationary with respect to the other of the rocker element and the support element.

3. Rocker device as claimed in claim 2, wherein the helical spring is located on a free end of the axle.

4. Rocker device as claimed in claim 3, wherein the helical spring runs around the axle.

5. Rocker device as claimed in claim 4, wherein an inner end of the spring is disposed in a receiving opening in the axle.

6. Rocker device as claimed in claim 5, wherein an outer end of the spring is a leg which is bent outwardly in a U-shape in a plane of the spring and which surrounds a projection on the other of the rocker element and the support element.

7. Rocker device as claimed in claim 6, wherein a mounting groove is provided extending axially in a peripheral surface at a free end of the axle, the groove being bevelled at an end of the groove at the free end of the axle has a radially directed receiving opening near an opposite end of the groove; and wherein an inner end of the spring is an essentially straight piece which runs radially in the spring plane and is disposed in said receiving opening.

8. Rocker device as claimed in claim 7, wherein the axle is stationary with respect to the rocker element.

9. Rocker device as claimed in claim 8, wherein axle is integral with the rocker element.

10. Rocker device as claimed in claim 5, wherein the receiving opening for the inner end of the spring, in the absence of external forces, is maintained by the spring at a predetermined distance from an edge of the axial opening in which the axle is disposed.

11. Process for mounting of a rocker device, for an openable motor vehicle roof, having a support element, a rocker element, an axle and a helical spring, the rocker element being connected to pivot via the axle with respect to the support element, and the spring acting between the rocker element and support element in a manner applying a pre-stressing force to the rocker element with respect to a direction of pivot motion; wherein the spring is arranged and formed in a manner for also applying a pre-stressing force between the rocker element and the support element in a lengthwise direction of said axle; wherein the axle is stationary with respect to one of the rocker element and the support element, and is guided through a corresponding axial opening in the other of the rocker element and the support element; wherein the helical spring is arranged concentrically relative to the axle, one end of the spring being stationary with respect to the axle and the other end of the spring being stationary with respect to the other of the rocker element and the support element, the helical spring being located on a free end of the axle running around the axle; wherein an outer end of the spring is a leg which is bent outwardly in a U-shape in a plane of the spring and surrounds a projection on the other of the rocker element and the support element; wherein a mounting groove is provided extending axially in a peripheral surface at a free end of the axle, the groove being beveled at an end of the groove at the free end of the axle and having a radially directed receiving opening near an opposite end of the groove; and wherein an inner end of the spring is an essentially straight piece which runs radially in the spring plane and is disposed in said receiving opening wherein the axle is stationary with respect to the rocker element; comprising the steps of: inserting the axle through the axial opening, attaching the helical spring to the free end of the axle such that inner end of the spring fits into the mounting groove, pushing the spring axially along the groove until the inner end of the spring fits into the receiving opening, and then moving the outer end of the helical spring against the circumferential spring force beyond and onto the projection so that the leg fits around the projection.

* * * * *